US008965857B2

(12) United States Patent
Zhou et al.

(10) Patent No.: US 8,965,857 B2
(45) Date of Patent: Feb. 24, 2015

(54) METHOD AND SYSTEM TO AVOID SPACE BLOATING DURING RUN-TIME COMPRESSION

(71) Applicants: Panfeng Zhou, Dublin, CA (US); Katsunori Terada, Dublin, CA (US); Yanhong Wang, Dublin, CA (US)

(72) Inventors: Panfeng Zhou, Dublin, CA (US); Katsunori Terada, Dublin, CA (US); Yanhong Wang, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 55 days.

(21) Appl. No.: 13/730,207

(22) Filed: Dec. 28, 2012

(65) Prior Publication Data

US 2014/0188821 A1    Jul. 3, 2014

(51) Int. Cl.
*G06F 7/00* (2006.01)
*G06F 17/30* (2006.01)

(52) U.S. Cl.
CPC .............................. *G06F 17/30153* (2013.01)
USPC ........................................................ 707/693

(58) Field of Classification Search
CPC ................... G06F 17/30171; G06F 17/30362; G06F 17/30; G06F 7/00; G06F 9/52; G06F 9/526; G06F 17/00; G06F 17/30359; G06F 12/00; G06F 17/30008; G06F 17/30153; G06F 17/30312; G06F 17/30371; G06F 17/30271; G06F 17/3028
USPC ................................................... 707/693, 704
See application file for complete search history.

(56) References Cited

U.S. PATENT DOCUMENTS

| 6,985,950 B1 * | 1/2006 | Hanson et al. ................ 709/226 |
| 2002/0073287 A1 * | 6/2002 | Allison et al. ................ 711/159 |

* cited by examiner

*Primary Examiner* — Truong Vo
(74) *Attorney, Agent, or Firm* — Sterne, Kessler, Goldstein & Fox P.L.L.C.

(57) ABSTRACT

Methods, systems, and computer program products are provided to manage a database system. The method includes locking during a database system idle time access by the database system to a data page of a data allocation unit, compressing during the database system idle time a data stored in the locked data page, and recording during the database system idle time an indication that the compressed and locked data page includes free storage space, wherein unlocked data pages of the data allocation unit are accessible by the database system during the compressing of the data stored in the locked data page. Thus, the data page may be compressed during idle time and the space freed therein may be used during a subsequent run time without the need for a reorganization of the data pages within the corresponding table (as in, for example, operation of a reorg+rebuild SQL command combination).

18 Claims, 5 Drawing Sheets

METHOD AND SYSTEM TO AVOID SPACE BLOATING DURING RUN-TIME COMPRESSION

BACKGROUND

1. Field

The present invention relates generally to databases and, more specifically, to improvements in efficiency for space utilization in a database.

2. Background

An important component of conventional database systems is their data compression capabilities. Data compression and reorganization may allow for better use of limited database space available. However, data compression and reorganization generally requires locking access to large segments of a database (e.g., table lock) for relatively long periods of time (e.g., by use of the reorg+rebuild SQL command combination).

For certain applications, such as high performance on-line transaction processing (OLTP) locking access to the database for relatively long periods of time (e.g., by use of reorg+rebuild command combination) is impractical, as fast and continuous access to the database is required. However, even for such systems, data compression and reorganization remains necessary to reduce database space, and thus, system cost.

SUMMARY

An exemplary embodiment includes systems, methods, and computer program products for managing a database system, the method including locking during a database system idle time access by the database system to a data page of a data allocation unit, compressing during the database system idle time a data stored in the locked data page, and recording during the database system idle time an indication that the compressed and locked data page includes free storage space, wherein unlocked data pages of the data allocation unit are accessible by the database system during the compressing of the data stored in the locked data page. The data page may be compressed during idle time and the space freed therein may be used during a subsequent run time without the need for a reorganization of the data pages within the corresponding table (as in, for example, operation of a reorg+rebuild SQL command combination).

Further features and advantages of the present invention, as well as the structure and operation of various exemplary embodiments of the present invention, are described in detail below with reference to the accompanying drawings. It is noted that the present invention is not limited to the specific exemplary embodiments described herein. Such exemplary embodiments are presented herein for illustrative purposes only. Additional embodiments will be apparent to persons skilled in the relevant art(s) based on the teachings disclosed herein.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art to make and use the disclosed and contemplated embodiments.

Figure 1:
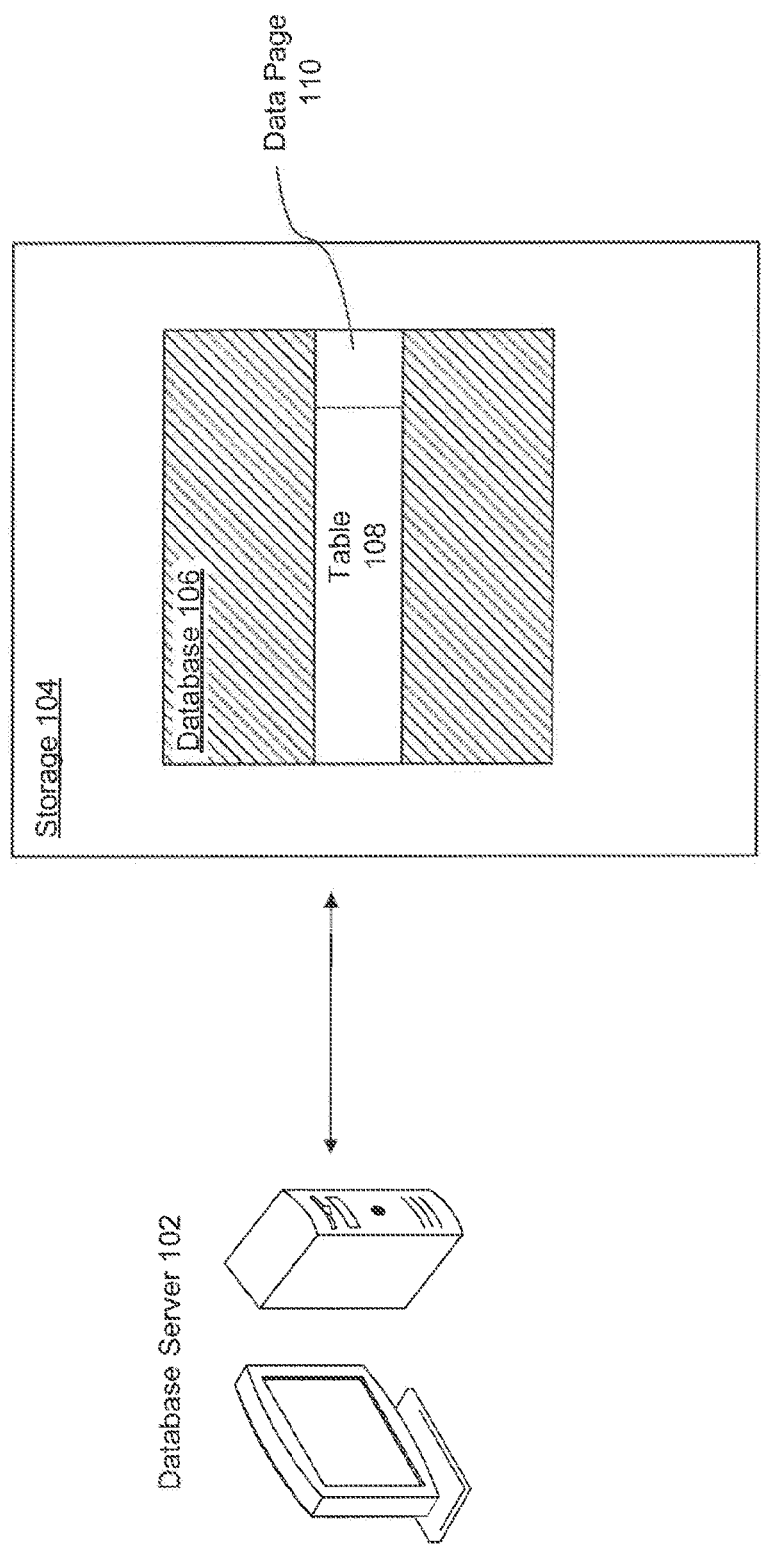
FIG. 1 illustrates a database management system, in accordance with an exemplary embodiment of the present invention.

The disclosure will now be presented with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of exemplary embodiments refers to the accompanying drawings that illustrate certain aspects of the disclosure. Other embodiments are possible, and modifications can be made to the exemplary embodiments within the spirit and scope of the present teachings. Therefore, the detailed description is not meant to limit the inventive concepts.

It would be apparent to one of skill in the art that one or more aspects of the present invention, as described below, can be implemented in many different embodiments of software, hardware, firmware, and/or the entities illustrated in the figures. Any actual software code with the specialized control of hardware to implement an exemplary embodiment of the present invention is not limiting of the invention. Thus, the operational behavior of the exemplary embodiment will be described with the understanding that modifications and variations of these embodiments are possible, and within the spirit and scope of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 illustrates a database management system ("DBMS") 100, in accordance with an exemplary embodiment of the present invention. DBMS 100 comprises a database server component 102 configured to run database server software. In a non-limiting exemplary embodiment, this database server software comprises the Adaptive Server Enterprise ("ASE") Relational Database Management Server ("RDBMS") software for high performance on-line transaction processing ("OLTP") applications developed by Sybase, Inc. DBMS 100 further comprises storage 104, on which database 106 is stored. Database 106 comprises data that can be served by DBMS 100 to one or more clients of the system. Database 106 includes a table, such as table 108, for storing specific user data. Table 108 includes a plurality of data pages, such as data page 110.

As it is known to those having ordinary skill in the art, a reorg+rebuild command combination, in combination with compression, may yield a desirable compression ratio (allocated storage space/compressed stored data). In particular, depending on selected options, these commands may be used to reconfigure a table's index, data, or both, to reduce or eliminate fragmentation which, combined with compression, yield an optimal amount of free space. However, for high performance OLTP applications, the reorg+rebuild command combination may be too computationally expensive for periodic or frequent use.

As will be explained in further detail below, in various exemplary embodiments, when a data page of database 106 (such as data page 110) is full, a page identifier corresponding to the data page is stored at a predetermined data structure (not shown) to indicate that data compression may be performed in the data page during a database system idle time. During the database system idle time the data page (instead of the entire database 106 or the entire table 108) is locked and compressed, and the page identifier corresponding to the data page (or another form of identification corresponding to the data page, such as a corresponding location in an array of bits), is stored such that the space freed by the compression is available for storage of user data during a subsequent database system run time.

Figure 2:
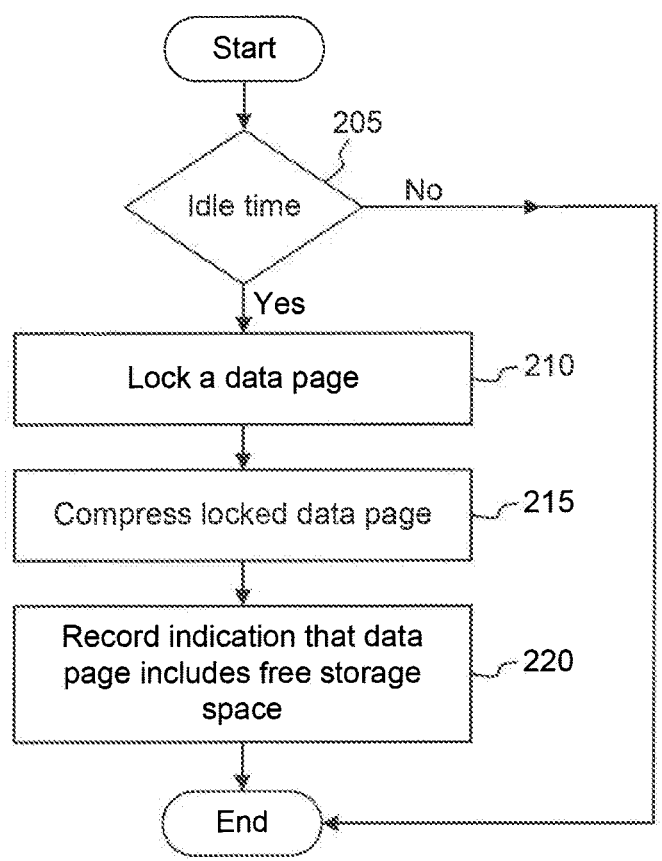
FIG. 2 is a flowchart illustrating steps in accordance with an exemplary embodiment of the present invention.

FIG. 2 is a flowchart 200 illustrating a method for freeing storage space in a data page during system idle time, according to an exemplary embodiment. At step 205, one or more computing devices of a database system, which may be embodied in database server 102 illustrated in FIG. 1 by way of non-limiting example, determine if the database server 102 is in idle mode. If the database server 102 is in idle mode, then the method proceeds to step 210 where the one or more computing devices lock a data page, such as data page 102 illustrated in FIG. 1. Locking a data page relates to restricting user access through database server 110, or through any other device logically coupled to the database system, for reading data from and/or writing data to the particular data page. The one or more computing devices may retain access to the particular data page for operations other than user access such as, for example, data compression.

At step 215, the one or more computing devices compress some or all of the data stored in data page 110. Those skilled in the art would understand that data compression may be performed using one or more generally known data compression algorithms without departing from the scope of the present invention. At step 220, the one or more computing devices record an indication that the compressed data page includes free storage space.

Accordingly, in various exemplary embodiments of the present invention a data page may be identified during the database system run time for compression during database system idle time, locked during the database system idle time to prevent reading from and/or writing into the data page by a user during a compression operation (e.g., by a user application), compressed, and identified as including freed storage space that may be used to store additional data during a future database system run time. Thus, the need for a reorganization of the data pages within the corresponding table (as in, for example, operation of a reorg+rebuild command combination) is obviated. Furthermore, during compression, data pages other than a data page being compressed within the corresponding table may be accessible to the database server 102, as the table is not locked for compression and reorganization (as is the case during execution of the reorg+rebuild command combination).

Figure 3:
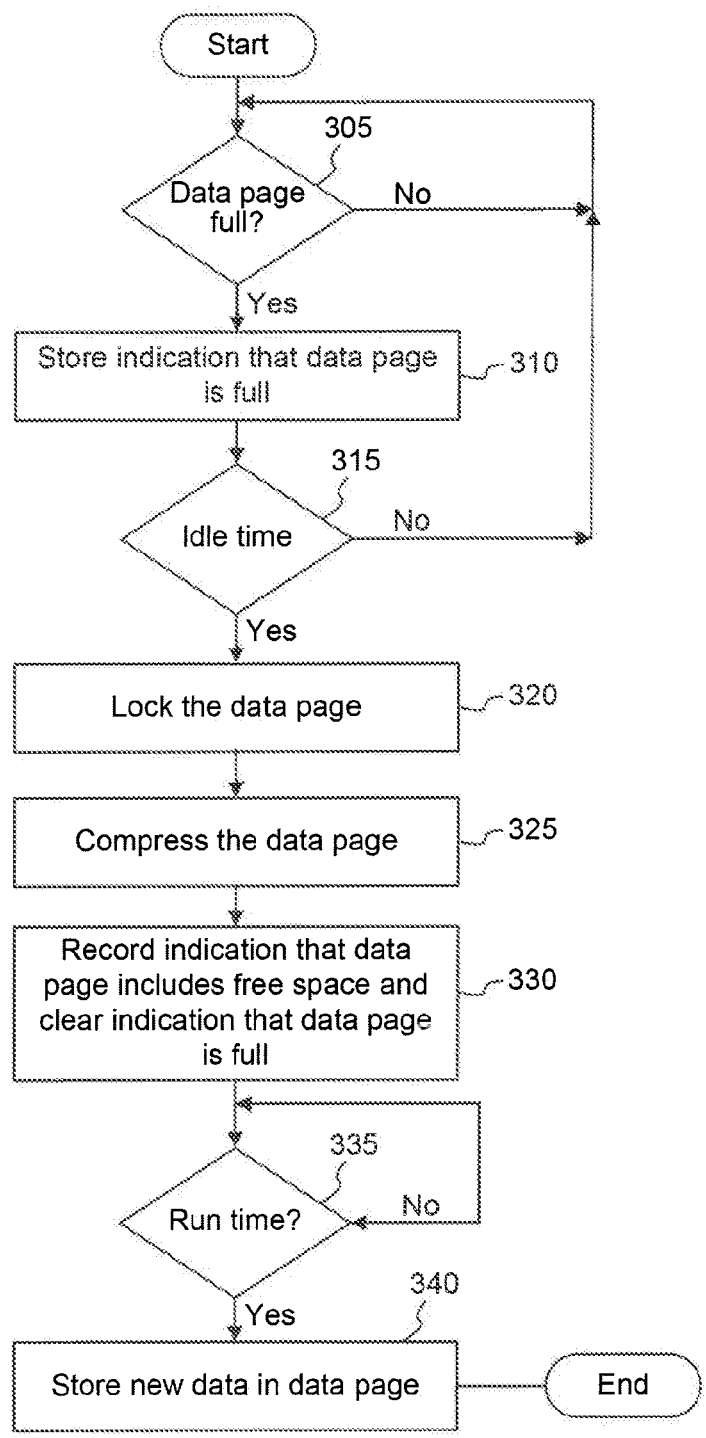
FIG. 3 is a flowchart illustrating steps in accordance with another exemplary embodiment of the present invention.

FIG. 3 is a flowchart 300 illustrating a method according to another exemplary embodiment of the present invention. At step 305, one or more computing devices of a database system, which may be embodied in database server 102 illustrated in FIG. 1, determine if a current data page (i.e., a data page currently used by the one or more computing devices to store user data), such as data page 102 illustrated in FIG. 1, is full and may be set for compression during a subsequent database system idle mode (e.g., as part of an idle mode background housekeeping process). If the current data page is full, at step 310 the one or more computing devices store an indication that the current data page is full. The indication may be in the form of an identifier associated with the current data page or the position of a field in a data structure, but the present invention is not so limited, and a person having ordinary skill in the art will recognize that there may be various ways to store this information without departing from the scope of the present teachings.

At step 315, the one or more computing devices determine if the database server 102 is in idle mode. If the database server 102 is in idle mode, in step 320 the one or more computing devices lock the data page based on the indication that the data page is full as set forth in step 310. At step 325, the one or more computing devices compress some or all of the data stored in data page 110. At step 330, the one or more computing devices record an indication that the compressed data page includes free storage space and clear the indication that the data page is full. The indication may be in the form of an identifier associated with the compressed data page or the position of a field in a data structure, but the present invention is not so limited, and a person having ordinary skill in the art will recognize that there may be various ways for store this information without departing from the scope of the present teachings.

At step 335, the one or more computing devices determine if the database server 102 is in run time mode (i.e., the database server can read and/or write data to the data pages of the database system). If the database server is in run time mode and the database server needs to store data in a new data page (i.e., a current data page is full), in step 340 the one or more computing devices store new user data in the recently-compressed data page based on the indication that the data page 102 includes free space.

Accordingly, in various exemplary embodiments of the present invention, a data page that becomes full may be identified during the database system run time, locked during the database system idle time to prevent reading from and/or writing into the data page by a user application during a compression operation, compressed, and identified as including freed storage space that may be used to store additional data during a subsequent database system run time. During a database system run time, when a current page is full and more space is necessary to store new user data, the database server determines if a previously used and compressed data page includes free space. If a previously used and compressed data page includes free space, the new user data is stored in the free space. If, on the other hand, no previously used data page includes free space (e.g., no compression has taken place or spaced freed by a previous compression has been already used) then a new data page is allocated to store the new user data.

Furthermore, as noted above with respect to FIG. 2, a full data page may be compressed during idle time and the space freed by the compression may be used during a subsequent run time without the need for a reorganization of the data pages within the corresponding table (as in, for example, operation of a reorg+rebuild command combination). In addition, during compression, data pages other than a data page being compressed within the corresponding table may be accessible to the database server 102, as the table is not locked for compression and reorganization (as is the case in the reorg rebuild command combination).

Figure 4:
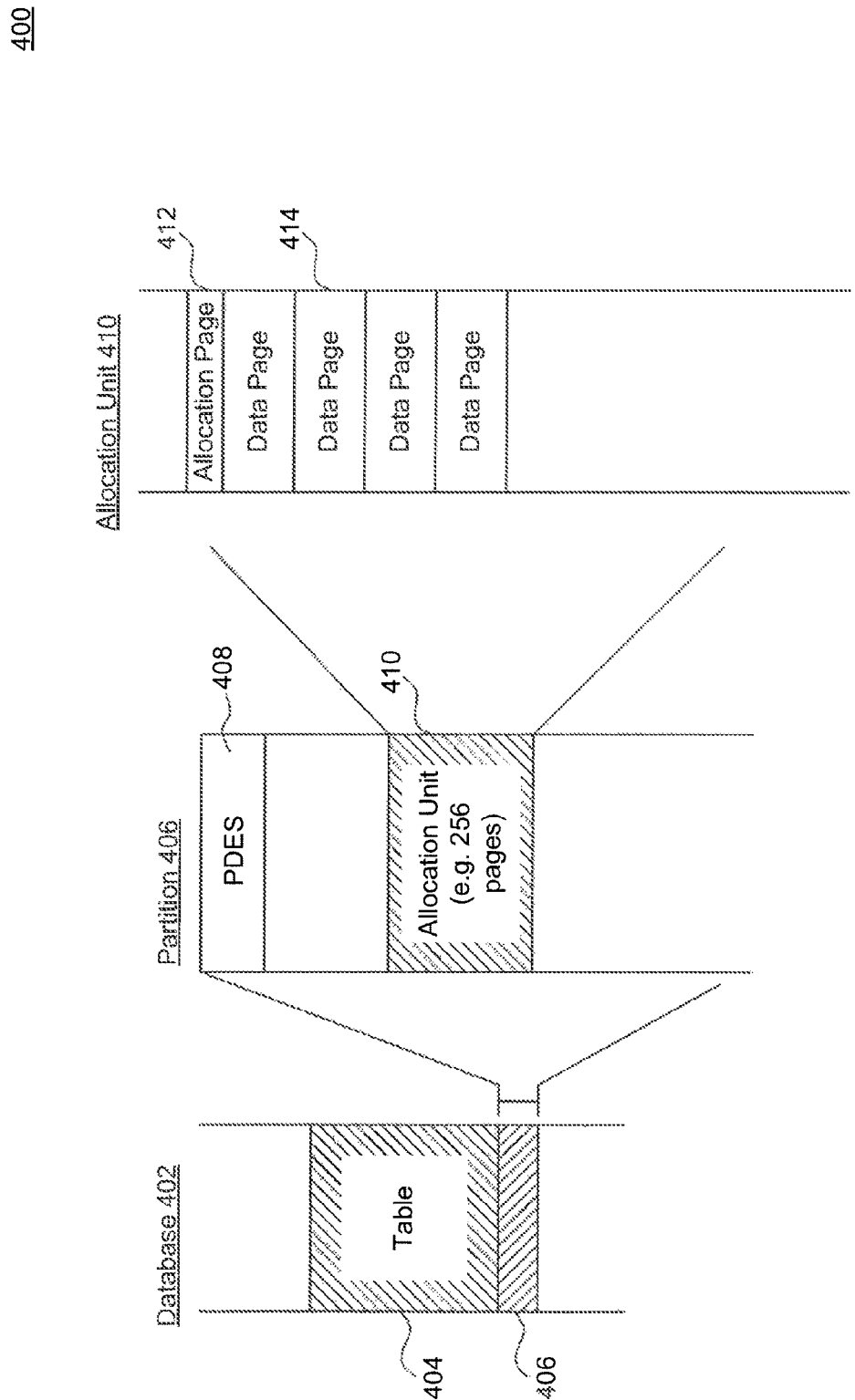
FIG. 4 is a diagram illustrating the relationship of exemplary space management components, in accordance with an exemplary embodiment of the present invention.

FIG. 4 is a diagram 400 illustrating the relationship of some of the aforementioned exemplary memory management components, in accordance with an exemplary embodiment of the present invention. As shown on the left portion of FIG. 4, a database 402 has a hash table 404 across a plurality of partitions 406.

As shown in the center portion of FIG. 4, each partition includes a partition descriptor (PDES) 408 for describing the contents of its corresponding partition and one or more allocation units 410, which are shown in FIG. 4 as having an exemplary 256 pages each. Each allocation unit 410, shown on the right portion of FIG. 5, has an allocation page 412 used to indicate which pages 414 of the allocation unit are free or used. The allocation unit has a plurality of data pages 414 over a contiguous storage space.

In various exemplary embodiments of the present invention, an array of page identifiers (PID_CMP_ARRAY, is included in the PDES of each partition. As illustrated in FIG. 2 and FIG. 3, during a database system idle time, pages are compressed and a corresponding indication is stored. The corresponding indication may be stored in PID_CMP_ARRAY as, for example, a page identifier or a bit in a position of the array corresponding to the page identifier for the compressed page, without departing from the scope of the present invention. During the database system run time, when a current page is full and more space is necessary to store new user data, the database server determines if a previously used and compressed data page includes free space by reading PID_CMP_ARRAY. If PID_CMP_ARRAY indicates that a previously used and compressed data page includes free space, a data page identified in PID_CMP_ARRAY becomes the current data page, the data page identifier is cleared from PID_CMP_ARRAY, and the new user data is stored in the free space of the new current data page (i.e., data page identified in PID_CMP_ARRAY). If, on the other hand, no previously used data page includes free space (i.e., PID_CMP_ARRAY is empty) then a new data page is allocated to store the new user data.

Example Computer System Implementation

Figure 5:
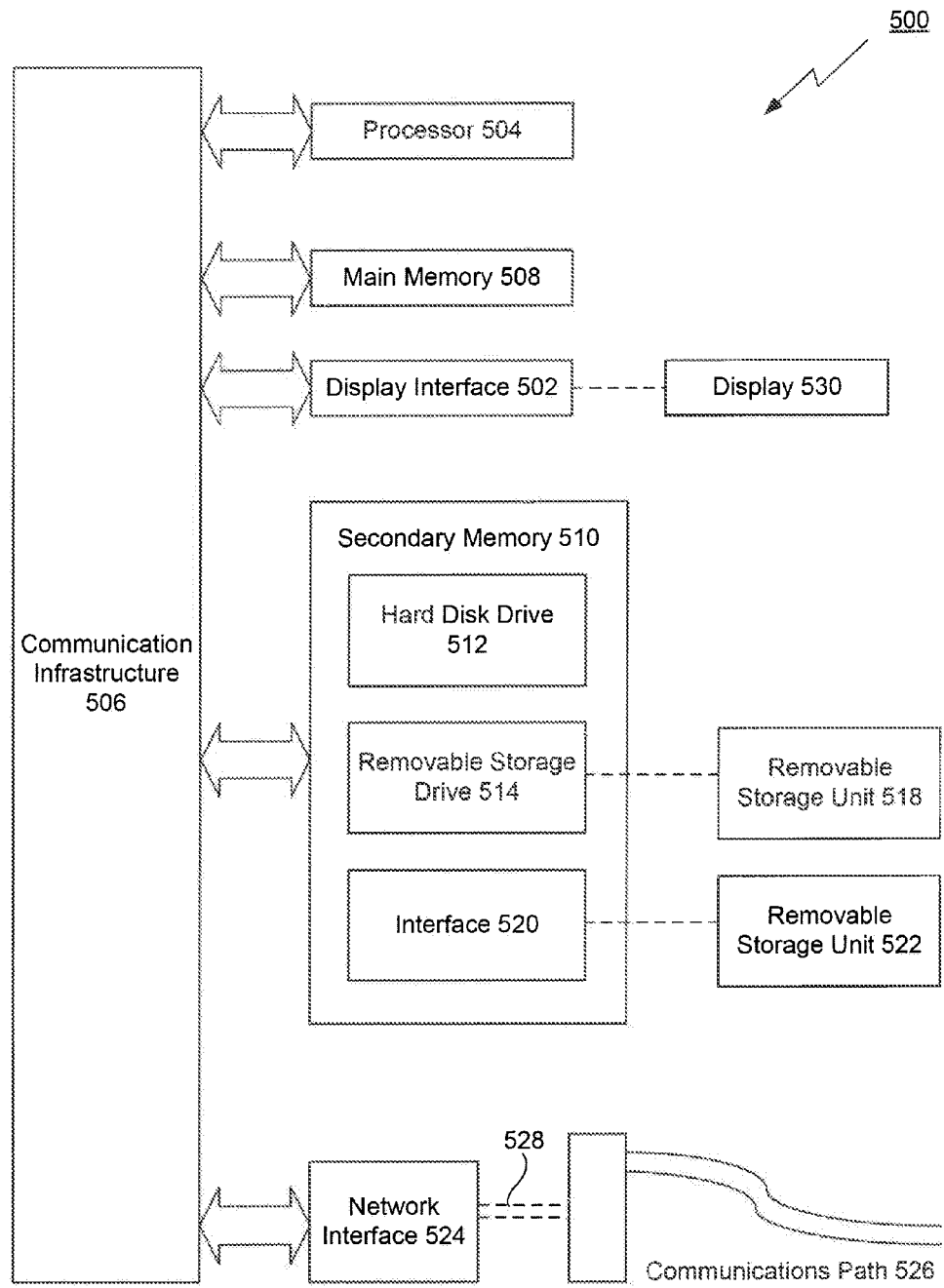
FIG. 5 depicts an exemplary computer system in which embodiments of the present invention may be implemented.

Various aspects of the present invention can be implemented by software, firmware, hardware, or a combination thereof. FIG. 5 illustrates an exemplary computer system 500 in which exemplary embodiments of the present invention, or portions thereof, can be implemented as computer-readable code. For example, the methods illustrated by flowcharts 200 of FIGS. 2 and 300 of FIG. 3, can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor 504 to implement the processes of the present invention, such as the steps in the methods illustrated by flowcharts 200 of FIG. 2, 300 of FIG. 3, and 400 of FIG. 4, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   locking, by one or more computing devices during an idle time of a database system, access by the database system to a data page;
   compressing, by the one or more computing devices during the idle time of the database system, data stored in the locked data page while the data page is locked; and
   recording, by the one or more computing devices during, the idle time of the database system, an indication that the locked data page includes free storage space in the locked data page,
   wherein the data page is one of a plurality of data pages in a data allocation unit of the database system, and
   wherein unlocked data pages of the data allocation unit are accessible by the database system during the compressing of the data stored in the locked data page.

2. The method of claim 1, further comprising:
   unlocking, by the one or more computing devices, access to the locked and compressed data page; and
   storing, by the one or more computing devices during a run time of the database system, a second data in the compressed data page based on the indication that the compressed data page includes free storage space.

3. The method of claim 2, further comprising:
   recording, by the one or more computing devices during the run time of the database system, an indication that the current data page for storing data is the compressed data page; and
   deleting, by the one or more computing devices during the run time of the database system, the indication that the compressed data page includes free storage space.

4. The method of claim 2, further comprising:
   recording, by the one or more computing devices during the run time of the database system, an indication that a second data page of the data allocation unit is full;
   locking, by the one or more computing devices during a second idle time of a database system, access by the database system to the second data page; and
   compressing, by the one or more computing devices during the second idle time of the database system, data stored in the locked second data page,
   wherein unlocked data pages of the data allocation unit are accessible by the database system during the compressing of the data stored in the locked second data page.

5. The method of claim 1, wherein
   the database system comprises a memory partition for storing data pages,
   the memory partition includes a partition descriptor data structure for storing information about stored data pages, and
   the recording of the indication that the compressed and locked data page includes free storage space comprises recording the indication in a partition description data structure corresponding to the partition of the locked and compressed data page.

6. A method comprising:
   storing, by one or more computing devices during a ran time of a database system, data in a data page that includes a compressed data based on an indication that the data page includes space freed by a compression of data.

7. The method of claim 6, further comprising:
   allocating, by the one or more computing devices during the run time of the database system, a second data page for storing data based on an indication that no previously-allocated and previously-compressed data page includes space freed by a compression of data.

8. The method of claim 7, further comprising:
   recording, by the one or more computing devices during the run time of the database system, an indication that the second data page is full;
   compressing, by the one or more computing devices during an idle time of the database system subsequent to the run time of the database system, data stored in the second data page; and
   recording, by the one or more computing devices, an indication that the second data page includes space freed by a compression of data.

9. A database system comprising:
   a memory; and
   at least one processor coupled to the memory and configured to:
   lock, during an idle time of the database system, access to a data page;
   compress, during the idle time of the database system, data stored in the locked data page while the data page is locked; and record, during the idle time of the database system, an indication that the locked data page includes free storage space in the locked data page, wherein the data page is one of a plurality of data pages in a data allocation unit of the database system, and wherein unlocked data pages of the data allocation unit are accessible by the database system during the compressing of the data stored in the locked data page.

10. The database system of claim 9, the at least one processor further configured to:

unlock access to the locked and compressed data page; and store, during a run time of the database system, a second data in the compressed data page based on the indication that the compressed data page includes free storage space.

11. The database system of claim 10, the at least one processor further configured to:

record, during the run time of the database system, an indication that the current data page for storing data is the compressed data page; and delete, during the run time of the database system, the indication that the compressed data page includes free storage space.

12. The database system of claim 10, the at least one processor further configured to:

record, during the run time of the database system, an indication that a second data page of the data allocation unit is full;

lock, during a second idle time of a database system, access by the database system to the second data page; and compress, during the second idle time of the database system, data stored in the locked second data page, wherein unlocked data pages of the data allocation unit are accessible by the database system during the compressing of the data stored in the locked second data page.

13. The database system of claim 9, the at least one processor further configured to:

store data pages according to a memory partition, wherein the memory partition includes a partition descriptor data structure for storing information about stored data pages; and record the indication that the compressed and locked data page includes free storage by recording the indication in a partition description data structure corresponding to the partition of the locked and compressed data page.

14. A computer-readable storage device having stored thereon instructions, execution of which, by a computing device, cause the computing device to perform operations comprising:

locking, by one or more computing devices during an idle time of a database system, access by the database system to a data page;

compressing, by the one or more computing devices during the idle time of the database system, data stored in the locked data page while the data page is locked; and recording, by the one or more computing devices during the idle time of the database system, an indication that the locked data page includes free storage space in the locked data page, wherein the data page is one of a plurality of data pages in a data allocation unit of the database system, and wherein unlocked data pages of the data allocation unit are accessible by the database system during the compressing of the data stored in the locked data page.

15. The computer-readable storage device of claim 14, the operations further comprising:

unlocking, by the one or more computing devices, access to the locked and compressed data page; and storing, by the one or more computing devices during a run time of the database system, a second data in the compressed data page based on the indication that the compressed data page includes free storage space.

16. The computer-readable storage device of claim 15, the operations further comprising:

recording, by the one or more computing devices during the run time of the database system, an indication that the current data page for storing data is the compressed data page; and deleting, by the one or more computing devices during the run time of the database system, the indication that the compressed data page includes free storage space.

17. The computer-readable storage device of claim 15, the operations further comprising:

recording, by the one or more computing devices during the run time of the database system, an indication that a second data page of the data allocation unit is full;

locking, by the one or more computing devices during a second idle time of a database system, access by the database system to the second data page; and compressing, by the one or more computing devices during the second idle time of the database system, data stored in the locked second data page, wherein unlocked data pages of the data allocation unit are accessible by the database system during the compressing of the data stored in the locked second data page.

18. The computer-readable storage device of claim 14, wherein the database system comprises a memory partition for storing data pages, the memory partition includes a partition descriptor data structure for storing information about stored data pages, and the recording of the indication that the compressed and locked data page includes free storage space comprises recording the indication in a partition description data structure corresponding to the partition of the locked and compressed data page.

* * * * *